(12) United States Patent
Moyer

(10) Patent No.: US 10,031,773 B2
(45) Date of Patent: Jul. 24, 2018

(54) METHOD TO COMMUNICATE TASK CONTEXT INFORMATION AND DEVICE THEREFOR

(71) Applicant: William C. Moyer, Dripping Springs, TX (US)

(72) Inventor: William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 690 days.

(21) Appl. No.: 14/185,005

(22) Filed: Feb. 20, 2014

(65) Prior Publication Data

US 2015/0234679 A1 Aug. 20, 2015

(51) Int. Cl.
*G06F 9/48* (2006.01)
(52) U.S. Cl.
CPC ...... *G06F 9/4856* (2013.01); *G06F 2209/509* (2013.01)
(58) Field of Classification Search
CPC .......................... G06F 9/4856; G06F 2209/509
See application file for complete search history.

(56) References Cited

U.S. PATENT DOCUMENTS

| | | | |
|---|---|---|---|
| 4,547,849 A | 10/1985 | Louie | |
| 5,715,439 A | 2/1998 | Schmidt et al. | |
| 5,923,893 A | 7/1999 | Moyer et al. | |
| 5,944,816 A | 8/1999 | Dutton et al. | |
| 6,134,653 A | 10/2000 | Roy et al. | |
| 6,360,243 B1* | 3/2002 | Lindsley et al. | 718/103 |
| 2002/0042870 A1 | 4/2002 | Rocray et al. | |
| 2007/0271556 A1* | 11/2007 | Eggers | G06F 8/458 717/151 |
| 2012/0230341 A1* | 9/2012 | Mital | G06F 9/3009 370/400 |
| 2014/0189713 A1* | 7/2014 | Ben-Kiki et al. | 718/108 |
| 2014/0344815 A1* | 11/2014 | Ginzburg | G06F 9/461 718/101 |

* cited by examiner

*Primary Examiner* — Li B Zhen
*Assistant Examiner* — Amir Soltanzadeh

(57) ABSTRACT

Task context information is transferred concurrently from a processor core to an accelerator and to a context memory. The accelerator performs an operation based on the task context information and the context memory saves the task context information. The order of transfer between the processor core is based upon a programmable indicator. During a context restore operation information is concurrently provided to data bus from both the accelerator and the processor core.

16 Claims, 5 Drawing Sheets

METHOD TO COMMUNICATE TASK CONTEXT INFORMATION AND DEVICE THEREFOR

FIELD OF THE DISCLOSURE

This disclosure relates generally to task switching, and more particularly to communication of task context information.

BACKGROUND

A data processing device may support simultaneous execution of multiple program tasks, and a single processor core of the data processing device may execute multiple program tasks in a sequential time-sliced manner. When a program task is suspended so that hardware resources can be utilized to execute another task, task context information associated with the task can be saved at a storage device. The task context information generally includes information stored at registers of the processor core that is executing the task being suspended. Accordingly, the context of the task is saved by copying the contents of these registers to a storage device, wherein the task can be suspended. At a later time, execution of the suspended task can be resumed by restoring the suspended task's saved context information associated to the processor core. For example, the task context information can be retrieved from the storage device and loaded into the registers at the processor core so that the contents of the registers match that at the time the first task was suspended.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Various embodiments herein disclose techniques for saving and restoring task context information at a data processing device in response to a task switching operation. In an embodiment of the present disclosure, parameters associated with an accelerator call of a program task are stored in one or more registers of a processor core executing the accelerator call and are provided to the accelerator at the same time that context data associated with the call's program task is provided to a context storage unit in response to a context switch that occurs in response to the call.

In another embodiment, in response to a context switch, such as a context switch in response to a program task executing accelerator call, the task context information of the program stored in register space of a processor core executing the program task can be sent in an out-of-order sequence. The ability to transfer task context information in an out-of-order sequence can facilitate the accelerator processing the call sooner by providing information stored in a specific registers prior to information stored in other registers.

In another embodiment, during a task restore operation, a sequence of data transfer cycles is used to return the stored task context information to the processor, wherein a portion of the sequence of data transfer cycles includes context information from a context storage unit, and a different portion of the sequence of data cycles includes context information that is the result information from an accelerator that was called by the task being restored. These embodiments, and others, will be better understood with reference to FIGS. 1-5.

Figure 1:
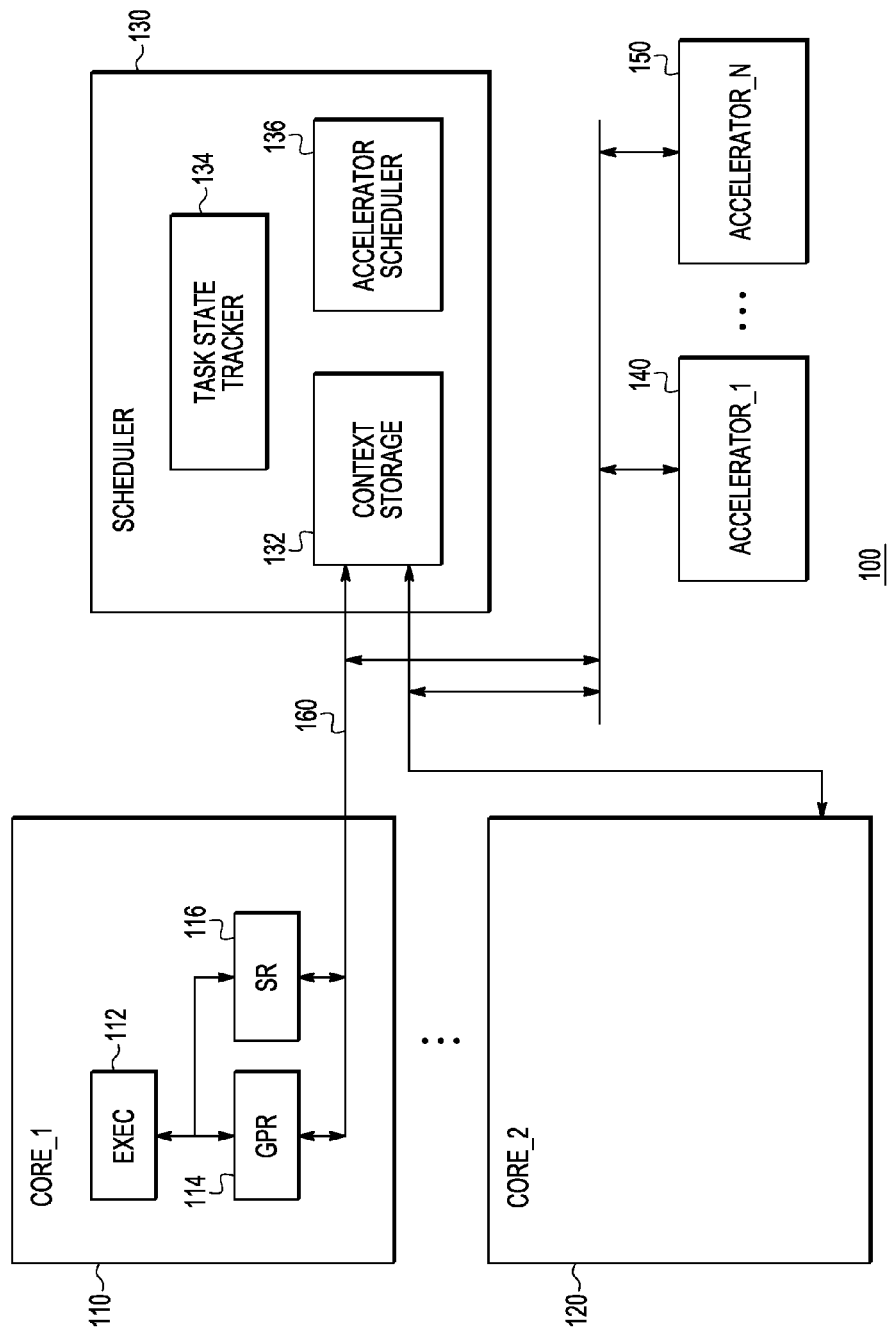
FIG. 1 is a block diagram illustrating a data processing device according to a specific embodiment of the present disclosure.

FIG. 1 is a block diagram illustrating a data processing device 100 according to a specific embodiment of the present disclosure. Data processing device 100 includes a processor core 110, a processor core 120, a task scheduler 130, an accelerator 140, and an accelerator 150. Processor cores 110 and 120, the accelerators 140 and 150, and the task scheduler 130 are coupled by an interconnect 160. Processor core 110 includes an execution unit 112, general purpose registers (GPRs) 114, and special registers (SRs) 116. Processor core 110 can include additional modules, not shown at FIG. 1. Processor core 120 can include similar modules as processor core 110. The description below will be directed to processor core 110, however the operation of processor core 120 is similar. Task scheduler 130 includes a context storage unit 132, a task state tracker 134, and an accelerator scheduler 136.

Processor core 110 is configured to execute one or more program tasks. During the execution of a particular program task, GPRs 114 can store data used and generated by that particular program task. For example, GPRs 114 can include thirty-two registers, R0-R31, that provide temporary storage of instruction operands, instruction results, intermediate data values, and the like. SRs 116 can include a link register to store an address to return to when a call completes, a condition register to store variables associated with conditional branch and comparison operations, a count register to support loop operations, and the like. Together, values stored at the GPRs 114 and SRs 116 store task context information associated with a current program task executing at processor core 110. In particular, the task context information is said to represent a context of the program task. Accordingly, a program task can be interrupted and later restarted by saving and subsequently restoring the contents of the GPRs 114 and SRs 116.

Task scheduler 130 is configured to orchestrate execution of program tasks at processor core 110 and processor core 120, and to coordinate execution of accelerator calls at accelerator 140 and accelerator 150. In an embodiment, task scheduler 130 can maintain task context information, also referred to as contexts, associated with up to sixteen unique program tasks for each processor core. The task context information is stored at context storage 132. Task state tracker 134 is configured to maintain status information associated with all program tasks of device 100, including tasks that are actively running and tasks that are presently idle. Accordingly, task scheduler 130 can continue execution of a desired program task at a processor core by first saving the task context of a currently executing task at context storage unit 132, and transferring task context information associated with the desired previously executing task from context storage unit 132 to registers at the processor core, a procedure referred to herein as a context switch. Task context information is transferred between processor core 110 and task scheduler 130 using interconnect 160. In an embodiment, task context information associated with each program task pending at task scheduler 130, for example, the task contexts, includes thirty-two values corresponding to the contents of GPRs 114 and three values corresponding to SRs 116, however a greater or a fewer number of registers may be employed to store all task context information corresponding to a program task.

In one embodiment of the present disclosure, a program task executing at a processor core can provide a yield signal to task scheduler 130, the yield signal indicating that the task has completed or is otherwise in a position to be paused. In response to the yield signal, task scheduler 130 can copy values stored in GPRs 114 and SRs 116 to context storage unit 132, thus preserving the task context information associated with the task so that the task can be restarted at a later time. Once the present task context information has been saved, the task scheduler 130 can transfer context information associated with another task from context storage unit 132 to GPRs 114 and SRs 116 and enable execution of the other task. In another embodiment, a program task executing at a processor core can issue an accelerator call, which can be a request to task scheduler 130 to provide an accelerator resource to perform a function, such as computation, identified by the call. For example, an accelerator call can include a request to perform a floating point mathematical operation at a hardware module that specializes in executing floating point instructions. Task scheduler 130, and accelerator scheduler 136 in particular, can forward the request to an appropriate accelerator, such as accelerator 140. Because an accelerator call may require a large number of instruction cycles to complete, task scheduler 130 can cause a task switch to be performed to configure the processor core to execute another program task, rather than remain idle while the accelerator call is completed. Accordingly, the task switch can save task context information associated with the calling task at context storage unit 132, restore task context information associated with another task, and initiate execution of the other task at processor core 110.

Figure 2:
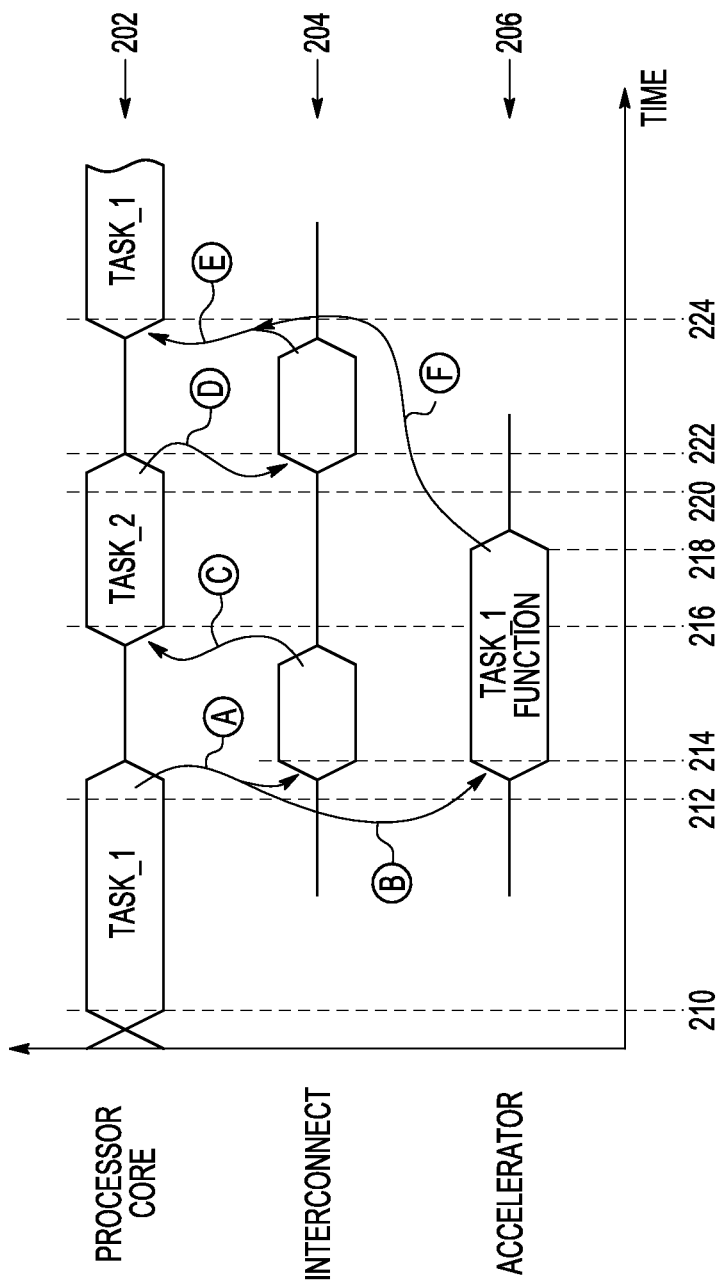
FIG. 2 is a timing diagram illustrating an accelerator call and an associated task switching operation according to a specific embodiment of the present disclosure.

FIG. 2 is a timing diagram 200 illustrating an accelerator call and an associated task switching operation according to a specific embodiment of the present disclosure. Timing diagram 200 includes a signal 202 that is a representation of a processor core operation, a signal 204 that is a representation of interconnect operations, and a signal 206 that is a representation of accelerator operations. For example, timing diagram 200 can illustrate the operation of processor core 110, interconnect 160, and accelerator 140, under the management of task scheduler 130. At time reference 210, a program task labeled task_1 is initiated at the processor core 110. Execution of task_1 continues until time reference 212, at which time an accelerator call instruction is executed. At time reference 214, task scheduler 130 initiates transfer, via the interconnect 160, of task context information stored at GPRs 114 and SRs 116 to context storage unit 132. In an embodiment, a portion of the task context information stored at GPRs 114 includes parameters associated with the accelerator call that are to be used by the accelerator 140. These accelerator parameters are provided to the accelerator 140 concurrently, such as simultaneously, with their provision to context storage unit 132, as indicated by arrow A and by arrow B. For example, registers R3 and R4 at GPRs 114 may store operands used by the accelerator call. At the same time that these values are propagated to task scheduler 130 using interconnect 160, such as over different conductors of the interconnect 160 that are commonly controlled, they can also be propagated to the accelerator 140. For example, values propagated via interconnect 160 can be visible to the accelerator 140, wherein the accelerator 140 can latch these values as needed. Execution of the accelerator function identified by the accelerator call can commence upon receipt of the operands.

During an interval of activity at interconnect 160, commencing at time reference 214, task scheduler 130 is also configured to restore previously stored context information of another task task_2, to processor core 110, as represented by arrow C. Saving and restoring of each register at processor core 110 can occur simultaneously, in an interlaced manner in which each register is saved and then restored sequentially, or the like. At time reference 216, task scheduler 130 has completed transfer of task context information corresponding to task_2 to GPRs 114 and SRs 116, and execution of the other task, task_2, can commence at processor core 110, as illustrated by signal 202. At time reference 220, task_2 can execute a Yield instruction to advise task scheduler 130 that task_2 has completed or is otherwise ready to relinquish control of processor core 110. At time reference 222, task scheduler 130 can save task context information associated with task_2 at context storage unit 132, as indicated by arrow D and activity at signal 204. At this time, task scheduler 130 can restore task context information associated with task_1 to registers at processor core 110, as indicated by arrow E. As described below in greater detail, according to an embodiment, one or more results generated at accelerator 140 in response to the accelerator call issued by task_1 can be returned to processor core 110 using interconnect 160, as indicated by arrow F, at the same time that other task context information associated with task_1 is returned from context storage unit 132 to processor core 110. For example, a portion of the 32 values corresponding to the 32 GPRs of the processor core can be provided by the context storage unit 132, and a different portion of the 32 values can be provided by the accelerator. At time reference 224, task scheduler 130 has completed transfer of task context information to registers at processor core 110 and execution of task_1 can resume.

In an embodiment, the order in which the GPR data is provided from the processor core is non-sequential to facilitate providing values needed by the accelerator to the interconnect 160 before providing values that are only being saved at the context storage location. For example, the sequence in which the GPRs are accessed when storing context information can be an out-of-order sequence, as opposed to an in-order sequence of the GPRs as determined by the physical addresses used by processor core to access the GPRs. The out-of-order sequence can be a fixed order, or an order that is user defined. The location at which values to be used by the accelerator can be defined by a protocol referred to herein as an application binary interface.

An Application Binary Interface (ABI) specifies an interface for compiled application programs to system software. For example, an ABI referred to as System V Application Binary Interface establishes a standard binary interface for application programs on systems that implement the interfaces defined in UNIX system V. Various supplements to an ABI can be defined. For example, a PowerPC ABI supplement to the UNIX System V ABI has been defined for workstation operating systems, such as IBM's AIX and Apple's Mac OS, that are implemented on the PowerPC architecture. An Embedded Application Binary Interface (EABI) can be derived from a particular ABI to optimize, or otherwise take advantage of, software executing on a particular hardware module. For example, an EABI can be derived from the PowerPC ABI supplement that defines interface requirements of embedded system software in order to optimize execution speed, for example, of software executing on an embedded PowerPC platform. Thus, the EABI can describe conventions for register usage, parameter passing, stack organization, and the like. For purposes of discussion, herein, the term ABI is used generically to generally refer to both ABIs, EABIs and their supplements.

It will be appreciated that an ABI can specify how parameters are passed to an accelerator during an accelerator call implemented by an embedded system as described above. The ABI protocol can also specify how results provided by the accelerator are returned to the calling task. For example, the ABI may specify that accelerator call parameters are passed to the accelerator using specific GPRs. Similarly, the ABI calling convention can specify that results returned by the accelerator are passed back to the calling task using one or more GPRs. As disclosed herein, when performing a context switching operation in response to an accelerator call, the scheduler 130 can retrieve the contents of the GPRs 114 in a defined order and location that is determined based on the ABI protocol, thereby providing parameters associated with an accelerator call to the hardware accelerator in a defined manner. This defined manner can result in the GPRs being accessed in an order that is sequentially different than an order defined by their respective physical addresses.

In an embodiment, the ABI protocol can be implemented by hardware so that the location and transfer order of parameters cannot be changed. In another embodiment, the ABI protocol can be represented by one or more programmable bits or registers, so as to allow the location and transfer order of accelerator parameters to be specified under software control. In still another embodiment, data processing device 100 can support more than one ABI protocol, where an indicator as to one of a plurality of possible ABIs is provided to identify the ABI that is applicable to the current call, so that a proper transfer order can be implemented, such as can be stored at a look-up table that stores protocol information for each of a plurality of ABIs. In still another embodiment, the order that task context information is transferred selectively, e.g., can vary, based upon information stored at a storage location, such as a special purpose register, that can be user programmed to indicate the specific order, e.g., an out-of-order sequence, that registers will be transferred during a context switch. The operation of task scheduler 130 can be better understood with reference to FIGS. 3 and 4.

Figure 3:
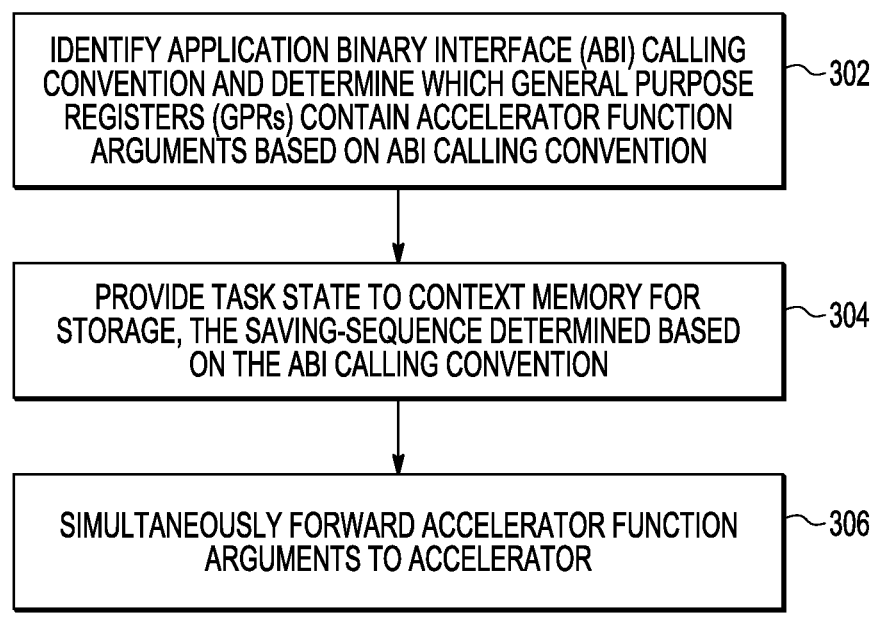
FIG. 3 is a flow diagram illustrating a method for determining a manner in which to save task context information during a context switch according to a specific embodiment of the present disclosure.

FIG. 3 is a flow diagram illustrating a method 300 for determining a manner in which to save task context information during a context switch according to a specific embodiment of the present disclosure. For example, the ordered sequence in which information is saved is determined to facilitate a call to an accelerator. The method 300 begins at block 302 where an ABI calling convention is identified, and locations containing parameters associated with the accelerator function are determined based on the ABI calling convention. Identification of the ABI calling convention can be accomplished by accessing information, determined based upon a specific ABI that identifies a specific order that context information is to be transferred during a context switch. For example, task scheduler 130, accelerator scheduler 136, or another module at data processing device 100, can use information that is based on a particular ABI protocol that source operands to be provided to an accelerator are located in registers R3, R4, and R5 of GPRs 114, and that a result to be generated by the accelerator is to be returned using register R6.

Assuming that the accelerator call results in a task switch of the calling task, the method continues at block 304 where task context information associated with the program task that issued the accelerator call is provided to a context memory for storage. In particular, the sequence that the task context information is retrieved from processor core registers and provided to the context save memory is determined based on the ABI calling convention. For example, task scheduler 130 can retrieve the contents of registers storing accelerator operands, such as R3-R5, during a first data transfer operation of a plurality of sequential data transfer operations. The method continues at block 306 where accelerator function arguments are concurrently, such as simultaneously, provided to an accelerator. For example, accelerator 140 can latch values retrieved from registers R3-R5 as the values are propagated via interconnect 160 en route to context storage unit 132. Accordingly, the order that processor task context information that is transferred during a context switch can be selected so that the state of registers containing operands for an accelerator is transferred prior to other register information. Thus allowing one transfer request to service both the context switch and the accelerator call, and allowing the accelerator call to be serviced prior to saving task context information that is not related to the call.

In one embodiment of the present disclosure, data processing device 100 is configured to comply with a single ABI calling convention. For example, the identity of registers containing operands for a call and the identity of a register or registers at which a result from a call is to be returned can be configured by hardware. In another embodiment, data processing device can support more than one ABI protocol. For example, a register (not shown at FIG. 1) can be configured to store a value identifying which one of a plurality of ABI protocols is operative at any given time, wherein different ABI can specify that operands are stored at different locations. Accordingly, registers associated with an accelerator call can be determined based on the presently active ABI protocol, and can be transferred using interconnect 160 during a context switch before the contents of registers that are not associated with the accelerator call. In still another embodiment, information stored at a configuration register can explicitly specify which registers are to be transferred during one or more initial data transfer operations, or a specific sequence in which registers are to be transferred.

In another embodiment of the present disclosure, interconnect 160 can be configured to receive information from a processor core at a time other than a time corresponding to a particular context save operation. For example, prior to execution of an accelerator call operation at processor core 110, the core can drive interconnect 160 with information associated with execution of instructions included at a program task. The information can include instruction operands, results of operations, and the like. In a particular embodiment, a value that will later represent an argument of a future accelerator call can be provided to interconnect 160, before the call is initiated by processor core 110. Accordingly, an accelerator, such as accelerator 140, can be configured to receive one or more operands associated with a not-yet issued accelerator call. In an embodiment, the accelerator can speculatively commence execution of the function. In addition, or alternatively, information provided to interconnect 160 prior to execution of an accelerator call or prior to initiation of a task switch operation at the processor core, can be stored at context storage unit 132, thus reducing the amount of information to be transferred during a subsequent program task switch operation. For example, values to be stored at GPRs R3-R5 prior to execution of an accelerator call can be driven onto interconnect 160 and captured at accelerator 140 and buffered at context storage 132. In one embodiment, data processing device 100 can determine which information to provide to interconnect 160 based on directives supplied by a program compiler.

In another embodiment of the present disclosure, a subset of registers included at GPRs 114 and SRs 116 can be identified as volatile. As used herein, a volatile register can contain information that is not guaranteed to be preserved when execution of an interrupted program task is restored. Therefore, the original contents of volatile registers do not need to be saved at context storage unit 132 when task scheduler 130 saves task context information associated with an interrupted program task, and the number of transfer operations necessary to perform a context switch can be reduced. Similarly, the contents of volatile registers do not need to be restored when execution of the program task is resumed. In accordance with a particular embodiment, the registers used to pass parameters to an accelerator can be volatile registers, such as when the ABI that specifies that a return result from the accelerator will be returned to the same registers. In this embodiment, since the information at the volatile registers is transferred to the accelerator during the context switch, the information may be stored at the context register as well, even though it does not need to be returned to the processor core when restoring a task switch.

Figure 4:
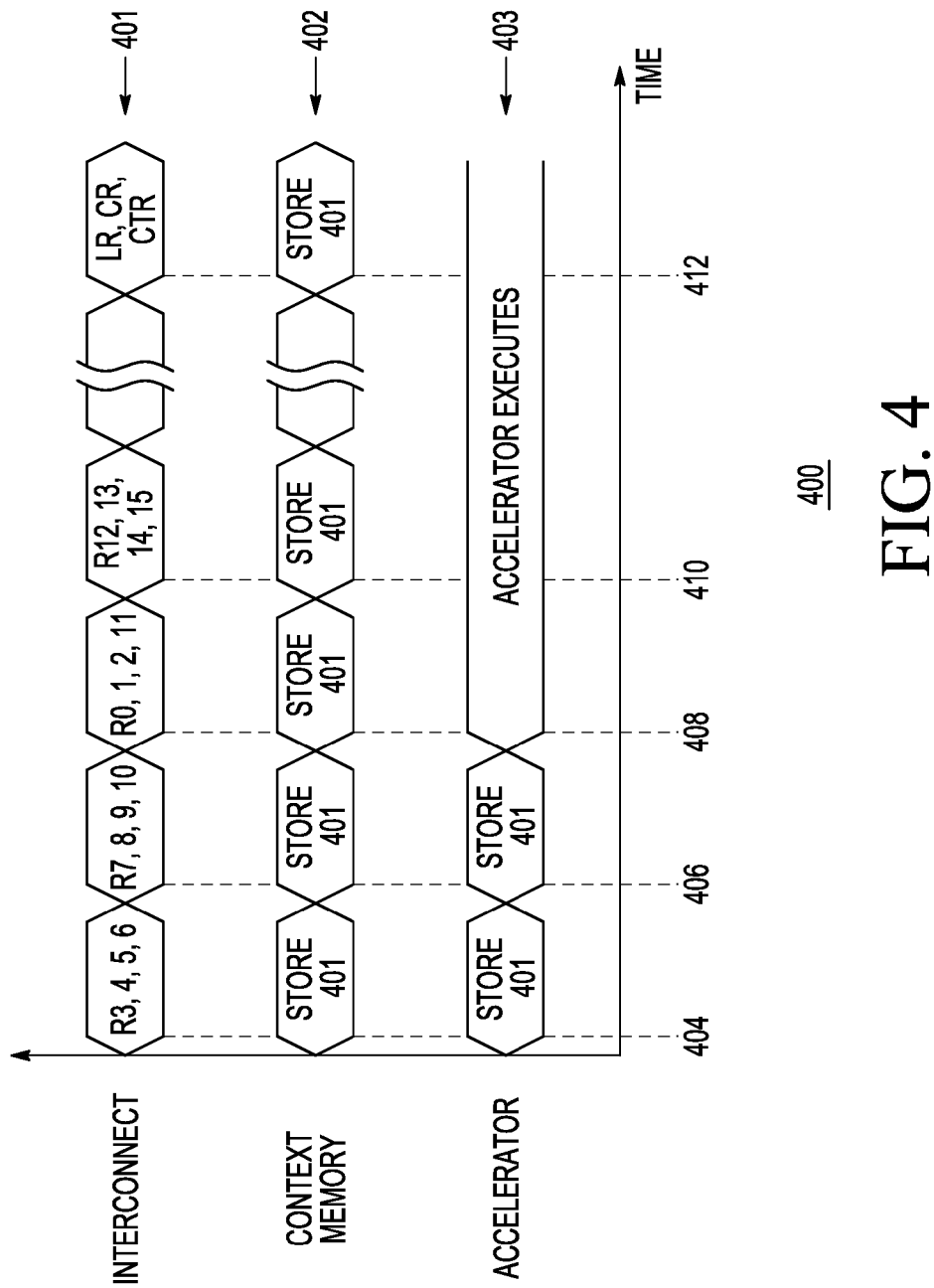
FIG. 4 is a timing diagram illustrating a transfer of task context information based on an application binary interface calling convention according to a specific embodiment of the present disclosure.

FIG. 4 is a timing diagram 400 illustrating transfer of task context information based on an ABI calling convention according to a specific embodiment of the present disclosure. Timing diagram 400 includes a signal 401 representative of interconnect 160 operations, signal 402 representative of operations at context storage 132, signal 403 representative of operations at accelerator 140. Timing diagram 400 also includes specific activities illustrated at time references 404, 406, 408, 410, and 412. At time reference 404, a first data transfer operation is conducted at interconnect 160. In particular, the contents of registers R3, R4, R5, and R6 of GPRs 114 are provided at interconnect 160. For example, in one embodiment, interconnect 160 can support transmission of 128 bits of information from a selected processor core, such as processor core 140, to task scheduler 130 and, optionally, to an accelerator unit, such as accelerator 140. Therefore, four thirty-two bit values corresponding to registers R3-R6 can be transmitted in parallel during a single data transfer operation. In another embodiment, interconnect 160 can support simultaneous transmission of a greater or a fewer number of bits of information. For example, interconnect 160 can include 64 signal paths to support transmission of two thirty-two bit values, 256 signal paths to support transmission of eight thirty-two bit values, or another number of bit values.

Still referring to time reference 404, timing diagram 400 illustrates storing the values contained in registers R3-R6 at context storage unit 132 and, in parallel, latching one or more of these values at an accelerator. For example, an accelerator function may be configured to receive 6 operands. An ABI calling convention can specify that these values are passed to accelerator 140 using registers R3-R8. Accordingly, the first four values can be latched at accelerator 140 during the first data transfer operation. At time reference 406, a second data transfer operation is conducted at interconnect 160. In particular, the contents of registers R7, R8, R9, and R10 of GPRs 114 are provided at interconnect 160. These four values can be stored at context storage unit 132, and in parallel, the values contained at registers R7 and R8 can be latched at accelerator 140. At this time, accelerator 140 has received all operands necessary to initiate execution of the accelerator function. At time reference 408, a third data transfer operation is conducted at interconnect 160. In particular, the contents of registers R0, R1, R2, and R11 of GPRs 114 are provided at interconnect 160. These values can be stored at context storage unit 132. Values stored at these registers are not needed by the accelerator call and therefore are not latched at accelerator 140.

At time reference 410, a fourth data transfer operation is conducted at interconnect to facilitate storage of the contents of registers R12-R15 at context storage unit 132. Additional transfer operations are conducted in a sequential manner until the contents of each register at GPRs 114 has been saved. As described above, task context information associated with execution of a program task can include the contents of one or more special registers. Accordingly, at time reference 412, the contents of a link register, a condition register, and a count register can be provided to the task scheduler for storage. At this time, all task context information associated with the program task has been saved at context storage unit 132. Execution of the program task can be resumed at a later time by restoring the saved task context information to the same or to a different processor core. One of skill will appreciate that the sequence in which the contents of registers are transferred can be varied without departing from the scope of the present disclosure as long as registers containing information needed by an accelerator are transferred during an initial data transfer or transfers. Furthermore, it will be appreciated that a task switch that is not the result of an accelerator call can transfer the context information to just the context storage in the same out-of-order sequence as is used for a task switch that is the result of an accelerator call. Alternatively, a task switch that is not the result of an accelerator call can transfer the context information to just the context storage in a different order than the out-of-order sequence that is used for a task switch that is the result of an accelerator call. For example, the sequence can be the in-order-sequence of the registers, or a different out-of-order sequence.

Figure 5:
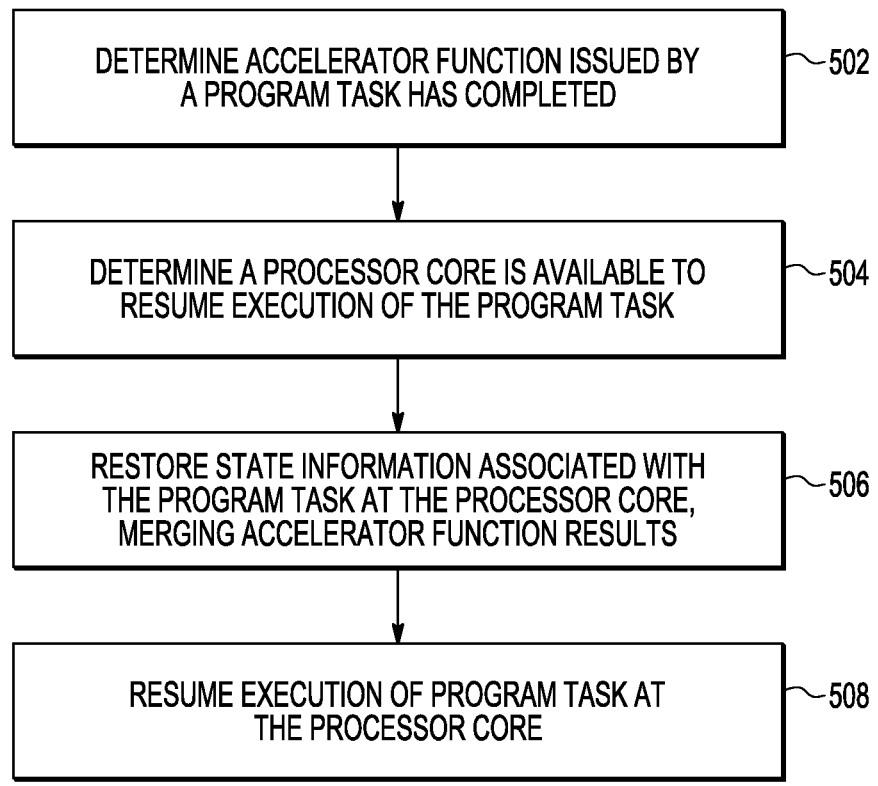
FIG. 5 is a flow diagram illustrating a method for merging acceleration task results during a restoration of task context information at a processor core according to a specific embodiment of the present disclosure.

FIG. 5 is a flow diagram illustrating a method 500 for merging acceleration task results with a restoration of task context information at a processor core according to a specific embodiment of the present disclosure. Method 500 begins at block 502 where it is determined that an accelerator call issued by a program task has completed. For example, a program task executing at processor core 110 can issue a call directed to accelerator 140. As described above, the calling task can perform a context switch to have its context information saved, and the task scheduler 130 can schedule execution of a second task at processor core 110 while the accelerator call is underway. The method continues at block 504 where it is determined that a processor core is available to resume execution of the program task based on the results calculated by accelerator 140. For example, task scheduler 130 can allocate processor core resources based on task priority information.

The method continues at block 506 where saved task context information associated with the program task that called accelerator 140 can be merged with results from accelerator 140 and provided to the processor core to restore the task context information. Results generated by the accelerator can be merged with the task context information as the information is transferred to the processor core. For example, once execution of the accelerator call has completed, task scheduler 130 can allocate processor core 110 to resume execution of the program task. Task context information associated with a different task that may have been executing at processor core 110 while the accelerator call was underway can be retrieved and stored at context storage unit 132, and task context information associated with the original program task that issued the accelerator call can be communicated to processor core 110 using interconnect 160 for storage at GPRs 114 and SRs 116. The ABI calling convention can specify which general purpose register or registers is to contain the result(s) generated in response to execution of the accelerator call. For example, the ABI can specify that a result of the accelerator call be returned to the calling program task using general purpose register R7, and that the original data stored at register R7 is volatile. Accordingly, a value stored at register R7 at the time that the accelerator function was called, and subsequently stored at context storage unit 132, can be ignored, and the result of the accelerator call is instead returned to register R7 at GPRs 114.

In an embodiment of the present disclosure, the result of the accelerator call can be maintained at a result latch included at accelerator 140 (not shown at FIG. 1), and provided to interconnect 160 at the same time that task scheduler 130 would have provided the original value contained in register R7. For example, during one transfer operation, task scheduler 130 can control the accelerator 140 and the context storage 132 to drive appropriate bit positions of interconnect 160 with the original values of registers R4, R5, and R6 stored at context storage 132, but refrain from driving information stored at context storage 132 that corresponds to register R7. Instead, accelerator 140 can drive bit positions of interconnect 160 corresponding to GPR register R7 with a value stored at the result latch of accelerator 140. Processor core 110 can receive the information conducted by interconnect 160 and store the information at registers R3-R7 of GPRs 114. In another embodiment, the result of the accelerator call can be forwarded to task scheduler 130 prior to restoring the task context information to processor core 110, and provided to interconnect 160 at an appropriate time. According to an embodiment, the context information being restored during a context switch is returned in-order, e.g., beginning with register R0 of the sequence R0-R31. Alternatively, the context information can be returned in the same, or different, out-of order sequence as the saved context data.

It will be appreciated, that a subsequent task switch that restores context information only from context storage, e.g., there is no accelerator result to return, can restore register R7 directly from context memory, as opposed to from the accelerator. Thus, during a particular transfer cycle, the context information driven onto a specific set of conductors of the interconnect can be provided from the accelerator, if a result of an accelerator call is being returned, or can be provided from the context memory, if no accelerator call result is being returned.

It will be appreciated that according to a first disclosed aspect, a method can include, in response to a request to perform a first context switch, determining an out-of-order sequence to transfer task context information of a first program task stored in a plurality of registers of a processor core, wherein the plurality of registers are general purpose registers of the processor core, and the out-of-order sequence is relative to an in-order sequence of the plurality of registers that is based upon their respective physical addresses. The method can further include transferring the task context information to a context storage unit based on the out-of-order sequence.

In one embodiment of the first aspect, the transferring of the task context information occurs during a plurality of data transfer operations, including an initial data transfer operation that occurs before other data transfer operations of the plurality of data transfer operations, wherein the initial data transfer operation transfers an initial portion of the task context information for storage at both the context storage unit and at an accelerator of a data processing device that also includes the processor core. In a particular embodiment of the method, determining which register of the plurality of registers stores the initial portion of the context information is based upon an indicator stored at a storage location. In a more particular embodiment, the storage location is a user programmable storage location. In another particular embodiment of the method, determining the out-of-order sequence is further in response to determining the first program task has executed an accelerator call. In an even more particular embodiment, in response to executing the accelerator call at the processor core, the accelerator receives the initial portion of the task context information, and begins execution of an accelerator function based upon the initial portion of the task context information prior to completion of the plurality of data transfer operations.

In another embodiment of the first aspect, the out-of-order sequence is based upon an application binary interface calling convention. In a further embodiment, during a second context switch subsequent the first context switch, the task context information of the first program task is restored, wherein an order of the task context information being restored is transferred to the processor core based on the in-order sequence.

In a second disclosed aspect, a method can include executing an accelerator call of a first program task, in response to executing the accelerator call, concurrently transferring first task context information of the first program task to both a context storage area and to an accelerator for storage, wherein the first task context information is a portion of a task context information of the first program task, and implementing an accelerator function at the accelerator based upon the first task context information.

In one embodiment of the second aspect, the first task context information is concurrently transferred to the context storage area and to the accelerator over different conductors of a common bus. Another embodiment includes determining a sequence to transfer the task context information to the context storage area, the sequence based on a calling convention of an application binary interface. In a further embodiment of the second aspect, the method includes determining a sequence to transfer the task context information to the context storage area, the sequence based on a stored value. In a particular embodiment, the stored value is a user programmable value.

In yet another embodiment of the second aspect, prior to concurrently transferring the first task context information, the method includes determining an order that the first task context information is to be transferred relative to a second task context information of the first program task, wherein the second task context information is not stored at the accelerator. In yet a further embodiment, concurrently transferring the first task context information of the first program task occurs during one or more of a plurality of data transfer operations including an initial data transfer operation, wherein the first task context information is transferred during the one or more transfer operations of the plurality of data transfer operations that include the initial data transfer operation. In a more particular embodiment, the task context information is transferred during the one or more data transfer operations based on a user programmable value. Another more particular embodiment includes initiating processing by the accelerator based upon the first context information prior to completing the plurality of data transfer operations.

In still another embodiment of the second aspect, the first task context information is stored at a general purpose register of a processor core executing the first program task.

In a third disclosed aspect, the method can include in response to a first context switch, retrieving first task context information associated with a first task from a storage unit, the first task context information to be stored at a first general purpose register of a processor core. In response to the first context switch, retrieving a second task context information associated with the first task from an accelerator, the second task context information being a result to a call made by the first task that is to be stored at a second general purpose register of the processor core, wherein the second task context information and the first task context information are concurrently provided to the processor core during a first data transfer operation conducted over an interface, wherein the first task context information is provided at first conductors of the first interface and the second context information is provided at second conductors of the interface.

In one embodiment of the third aspect, the method includes, in response to a second context switch, retrieving third task context information associated with a second task from the storage unit, the third task context information to be stored at the first general purpose register of a processor core and at the second general purpose register, wherein the third task context information is concurrently provided to the processor core during a second data transfer operation conducted over the interface, wherein the third task context information is provided at the first conductors and at the second conductors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   in response to a request to perform a first context switch and determining a first program task has executed an accelerator call, determining an out-of-order sequence to transfer task context information of the first program task stored in a plurality of registers of a processor core, wherein the plurality of registers are general purpose registers of the processor core, and the out-of-order sequence is relative to an in-order sequence of the plurality of registers that is based upon their respective physical addresses; and
   transferring the task context information to a context storage unit based on the out-of-order sequence during a plurality of data transfer operations, including an initial data transfer operation that occurs before other data transfer operations of the plurality of data transfer operations, wherein the initial data transfer operation transfers an initial portion of the task context information for storage at both the context storage unit and at an accelerator of a data processing device that also includes the processor core.

2. The method of claim 1, wherein determining which register of the plurality of registers stores the initial portion of the context information is based upon an indicator stored at a storage location.

3. The method of claim 2, wherein the storage location is a user programmable storage location.

4. The method of claim 1, wherein in response to executing the accelerator call at the processor core, the accelerator receives the initial portion of the task context information, and begins execution of an accelerator function based upon the initial portion of the task context information prior to completion of the plurality of data transfer operations.

5. The method of claim 1, wherein the out-of-order sequence is based upon an application binary interface calling convention.

6. The method of claim 1, wherein during a second context switch subsequent the first context switch, the task context information of the first program task is restored, wherein an order of the task context information being restored is transferred to the processor core based on the in-order sequence.

7. A method comprising:
   executing an accelerator call of a first program task;
   in response to executing the accelerator call and a request to perform a first context switch, determining an out-of-order sequence to transfer task context information of the first program task stored in a plurality of registers of a processor core, wherein the plurality of registers are general purpose registers of the processor core, and the out-of-order sequence is relative to an in-order sequence of the plurality of registers that is based upon their respective physical addresses;

concurrently transferring first task context information of the first program task to both a context storage area and to an accelerator for storage during a plurality of data transfer operations, including an initial data transfer operation that occurs before other data transfer operations of the plurality of data transfer operations, wherein the initial data transfer operation transfers an initial portion of the task context, information for storage at both the context storage unit and at the accelerator of a data processing device that also includes a processor core, wherein the first task context information is a portion of a task context information of the first program task; and implementing an accelerator function at the accelerator based upon the first task context information.

8. The method of claim 7, wherein the first task context information is concurrently transferred to the context storage area and to the accelerator over different conductors of a common bus.

9. The method of claim 7, further comprising:
determining a sequence to transfer the task context information to the context storage area, the sequence based on a calling convention of an application binary interface.

10. The method of claim 7, further comprising:
determining a sequence to transfer the task context information to the context storage area, the sequence based on a stored value.

11. The method of claim 10, wherein the stored value is a user programmable value.

12. The method of claim 7, wherein prior to concurrently transferring the first task context information, determining an order that the first task context information is to be transferred relative to a second task context information of the first program task, wherein the second task context information is not stored at the accelerator.

13. The method of claim 7, wherein the task context information is transferred during the one or more data transfer operations based on a user programmable value.

14. The method of claim 7, further comprising initiating processing by the accelerator based upon the first context information prior to completing the plurality of data transfer operations.

15. The method of claim 7, wherein the first task context information is stored at a general purpose register of a processor core executing the first program task.

16. A method comprising:
in response to a first context switch, retrieving first task context information associated with a first task from a storage unit, the first task context information to be stored at a first general purpose register of a processor core;

in response to the first context switch, retrieving a second task context information associated with the first task from an accelerator, the second task context information being a result to a call made by the first task that is to be stored at a second general purpose register of the processor core, wherein the second task context information and the first task context information are concurrently provided to the processor core during a first data transfer operation conducted over an interface, wherein the first task context information is provided at first conductors of the first interface and the second context information is provided at second conductors of the interface; and in response to a second context switch, retrieving third task context information associated with a second task from the storage unit, the third task context information to be stored at the first general purpose register of a processor core and at the second general purpose register, wherein the third task context information is concurrently provided to the processor core during a second data transfer operation conducted over the interface, wherein the third task context information is provided at the first conductors and at the second conductors.

* * * * *